US012031074B1

(12) United States Patent
Sherburne

(10) Patent No.: US 12,031,074 B1
(45) Date of Patent: Jul. 9, 2024

(54) ARTICLE COMPRISING BONDED SUBSTRATE COMPRISING NANOCRYSTALS AND METHOD OF MAKING AND USING SAME

(71) Applicant: Government of the United States, as represented by the Secretary of the Air Force, Wright-Patterson AFB, OH (US)

(72) Inventor: Michael D. Sherburne, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 975 days.

(21) Appl. No.: 17/001,719

(22) Filed: Aug. 25, 2020

Related U.S. Application Data

(60) Provisional application No. 63/057,314, filed on Jul. 28, 2020.

(51) Int. Cl.
| | | |
|---|---|---|
| C09K 11/88 | (2006.01) |
| B05D 3/06 | (2006.01) |
| B05D 7/00 | (2006.01) |
| C09D 5/22 | (2006.01) |
| C09D 163/00 | (2006.01) |
| G01N 21/33 | (2006.01) |

(Continued)

(52) U.S. Cl.
CPC ............ *C09K 11/883* (2013.01); *B05D 3/067* (2013.01); *B05D 7/546* (2013.01); *C09D 5/22* (2013.01); *C09D 163/00* (2013.01); *G01N 21/33* (2013.01); *B05D 2350/60* (2013.01); *B05D 2504/00* (2013.01); *B82Y 30/00* (2013.01); *B82Y 40/00* (2013.01)

(58) Field of Classification Search
CPC ...... C09K 11/883; B05D 3/067; B05D 7/546; B05D 2350/60; B05D 2504/00; C09D 5/22; C09D 163/00; G01N 21/33; B82Y 30/00; B82Y 40/00
USPC .......................................................... 356/32
See application file for complete search history.

(56) References Cited

U.S. PATENT DOCUMENTS 6,322,901 B1 * 11/2001 Bawendi .............. C09K 11/883
428/548
9,638,178 B1    5/2017 Courtney
(Continued)

OTHER PUBLICATIONS

Shauloff, N.; Sagarika Bhattacharya, S.; Jelinek, R. Elastic carbon dot/polymer films for fluorescent tensile sensing and mechano-optical tuning, Carbon 152, 2019, 363-371.
(Continued)

*Primary Examiner* — Michael A Lyons
*Assistant Examiner* — Omar H Nixon
(74) *Attorney, Agent, or Firm* — AFMCLO/JAZ; James F. McBride

(57) ABSTRACT

The present invention relates to devices for measuring property changes via in-situ micro-viscometry and methods of using same. The aforementioned device is inexpensive and can be used to quickly and accurately measure numerous physical and chemical property changes, including but not limited to the rate of chemical cure, change in tack, and rate of mass loss, for example, rate of moisture, solvent and/or plasticizer change.

8 Claims, 6 Drawing Sheets
(2 of 6 Drawing Sheet(s) Filed in Color)

(51) Int. Cl.
*B82Y 30/00* (2011.01)
*B82Y 40/00* (2011.01)

(56) References Cited

U.S. PATENT DOCUMENTS

| | | | | |
|---|---|---|---|---|
| 2002/0071952 | A1* | 6/2002 | Bawendi | C30B 29/48 |
| | | | | 428/403 |
| 2006/0019098 | A1* | 1/2006 | Chan | B01J 13/02 |
| | | | | 427/212 |
| 2007/0111324 | A1* | 5/2007 | Nie | H01L 31/03529 |
| | | | | 977/816 |
| 2010/0110728 | A1* | 5/2010 | Dubrow | G02B 1/10 |
| | | | | 252/301.36 |

OTHER PUBLICATIONS

Lin, S. F.; Zhao, Z. M.; Luan, W. L.; Tu, S. T. In-Situ Strain Gauge: Based on Photoluminescence of Quantum Dots Procedia Engineering 130, 2015, 1788-1794.

Johnson, H. T.; Bose, R.; Goldberg, B. B.; Robinson, H. D.; Effects of externally applied stress on the properties of quantum dot nanostructures 1-20.

Zhang, Y.; Chen, Y.; Mietschke, M.; Zhang, L.; Yuan, F.; Abel, S.; Hühne, R.; Nielsch, K.; Fompeyrine, J.; Ding, F.; Schmidt, O. G.; Monolithically Integrated Microelectromechanical Systems for On-Chip Strain Engineering of Quantum Dots Nano Lett. 2016, 16, 5785-5791.

Zhang, S.; Yin, S.; Weiling Luan, W.; Yang, F.; Strain Monitoring via Self-Assembled Quantum Dots Applied Mechanics and Materials 2016, ISSN: 1662-7482, vol. 853, pp. 493-497.

Sherburne, M. D.; Thesis X-Ray Detection and Strain Sensing Applications of Colloidal Quantum Dots, Part 1 Mar. 20, 2020.

Sherburne, M. D.; Thesis X-Ray Detection and Strain Sensing Applications of Colloidal Quantum Dots, Part 2 Mar. 20, 2020.

Sherburne, M. D.; Thesis X-Ray Detection and Strain Sensing Applications of Colloidal Quantum Dots, Part 3 Mar. 20, 2020.

Sherburne, M.; Laurvick, T.; Burggraf, L.; Bean,I.; Crandall, P.; Du, M.; Adams, C.; Burke, E.; Osinski, M.; Senthil, A.; Bosomtwi, D.; Gharde, S.; Alas, G.; Ivanov, S.; Klimov, V.; Fedin, I.; Weber, T.; Characterizing Nanomaterial Response for sub-100 ps X-ray Scintillation Oct. 22, 2019, 1.

* cited by examiner

ARTICLE COMPRISING BONDED SUBSTRATE COMPRISING NANOCRYSTALS AND METHOD OF MAKING AND USING SAME

The present application claims priority to U.S. Provisional Application Ser. No. 63/057,314 filed Jul. 28, 2020, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to article comprising bonded substrate comprising nanocrystals and method of making and using same.

BACKGROUND OF THE INVENTION

Nanocrystals are used to measure the strain that an article experiences by embedding the nanocrystals in a polymer matrix and then hard baking the polymer to the article. When the article experiences strain, the nanocrystals are also strained and such crystals' radiation properties change. Such change can then be correlated to a strain value. Unfortunately, the aforementioned strain value only provides one peak wavelength of light to correlate to a strain value. As a result, the accuracy to the article's strain failure point is not as accurate as desired. Applicants surprisingly found that when an article comprises a judiciously selected interface between the polymer matrix and the article, a second peak wavelength of light is obtained. Such second peak shortens the gap of measured strain to the failure point of the article. Thus, increased strain resolution is obtained before the failure point of the article is reached.

SUMMARY OF THE INVENTION

The present invention relates to a process in utilizing nanocrystals loaded within a substrate and applied onto a surface for use in strain sensing and methods using same. The aforementioned process is inexpensive and can be used to quickly and accurately measure strain, including but not limited to structures, vehicles, vessels, quality control of materials, and aircraft. This can all be done optically, allowing for measurements to be taken on complex geometries.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1:
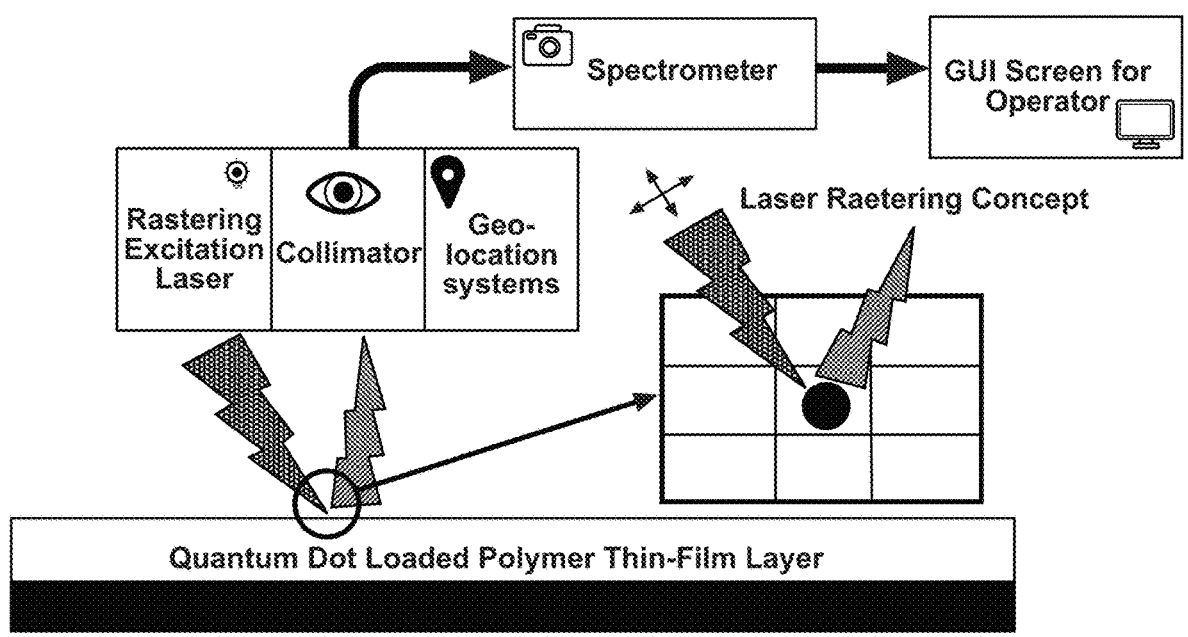
FIG. 1 is showing the preferred configuration of this invention by rastering an excitation source across the surface of the nanocrystal layer on the surface of a device under test.

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within

DETAILED DESCRIPTION OF THE INVENTION

For purposes of this specification, headings are not considered paragraphs and thus this paragraph is Paragraph 0022 of the present specification. The individual number of each paragraph above and below this paragraph can be determined by reference to this paragraph's number. In this Paragraph 0022, Applicant discloses an article comprising a surface, said surface comprising:
a) one or more pre-coatings; and
b) one or more coatings that comprise colloidal nanocrystals,
said one or more pre-coatings coating said surface and said one or more coatings that comprise colloidal nanocrystals coating said one or more pre-coatings, preferably said colloidal nanocrystals are disposed throughout said one or more coatings. Said nanocrystals can have any geometry.

Applicant discloses the article of Paragraph 0022 wherein:
a) said one or more pre-coatings have a thickness of from about 1 μm to about 1 mm, preferably said one or more pre-coatings have a thickness of from about 1 μm to about 500 μm, more preferably said one or more pre-coatings have a thickness of from about 1 μm to about 100 μm, most preferably said one or more pre-coatings have a thickness of from about 1 μm to about 10 μm;
b) said one or more coatings that comprise colloidal nanocrystals having a thickness of from about 20 nm to about 2.54 cm, preferably said one or more pre-coatings have a thickness of from about 20 nm to about 1 mm, more preferably said one or more pre-coatings have a thickness of from about 20 nm to about 100 um, most preferably said one or more pre-coatings have a thickness of from about 20 nm to about 10 um; and
c) said one or more coatings that comprise colloidal nanocrystals having a colloidal nanocrystal concentration of from about 1 ppb to about 1000 ppm, preferably said one or more pre-coatings have a colloidal nanocrystal concentration of from about 500 ppb to about 1000 ppm, more preferably said one or more pre-coatings have a colloidal nanocrystal concentration of from about 1 ppm to about 1000 ppm, most preferably said one or more pre-coatings have a colloidal nanocrystal concentration of from about 10 ppm to about 1000 ppm.

Applicant discloses the article of Paragraphs 0022 through 0023 wherein said colloidal nanocrystals are selected from the group consisting of InP/ZnS quantum dots, CdSe/ZnS quantum dots, CdSe quantum dots, PbS quantum dots, PbSe quantum dots, CdS quantum dots, $CuInS_2$/ZnS quantum dots, CdSe nanoplatelets, Mn:ZnSe quantum dots, CdTe, CdTeSeS Type-II quantum dots, $CdS_xSe_{1-x}$/ZnS alloyed quantum dots wherein x is from 0.1 to 0.9 and mixtures thereof, preferably said colloidal nanocrystals are selected from the group consisting of InP/ZnS quantum dots, CdSe/ZnS quantum dots, $CuInS_2$/ZnS quantum dots, Mn:ZnSe quantum dots, $CdS_xSe_{1-x}$/ZnS alloyed quantum dots wherein x is from 0.1 to 0.9 and mixtures thereof, more preferably said colloidal nanocrystals are selected from the group consisting of InP/ZnS quantum dots, CdSe/ZnS quantum dots, $CuInS_2$/ZnS quantum dots, and mixtures thereof, most preferably said colloidal nanocrystals are InP/ZnS quantum dots.

Applicant discloses the article of Paragraphs 0022 through 0024 wherein said one or more pre-coatings comprises a polymer and more preferably comprises polyepoxides, and most preferably comprises epoxy-resin.

Applicant discloses the article of Paragraphs 0022 through 0024 wherein said one or more coatings comprises a polymer, more preferably comprises an epoxy, and most preferably an epoxy-based photoresist.

Applicant discloses the article of Paragraphs 0022 through 0025 comprising one or more coatings that coat said one or more coatings that comprise colloidal nanocrystals, said one or more coatings that coat said one or more coatings that comprise colloidal nanocrystals comprising a polymer. Said one or more coatings that coat said one or more coatings that comprise colloidal nanocrystals can serve as a protective coating and/or allow the skilled artisan to form a composite structure.

Applicant discloses the article of Paragraph 0027 said one or more coatings that coat said one or more coatings that comprise colloidal nanocrystals having a thickness of from about 0.1 nm to about 2.54 cm, preferably said one or more coatings that coat said one or more coatings that comprise colloidal nanocrystals having a thickness of from about 0.1 nm to about 1 mm, more preferably said one or more coatings that coat said one or more coatings that comprise colloidal nanocrystals having a thickness of from about 0.1 nm to about 100 μm, most preferably said one or more coatings that coat said one or more coatings that comprise colloidal nanocrystals having a thickness of from about 0.1 nm to about 10 μm.

Applicant discloses the article of Paragraphs 0022 through 0028 wherein said one or more pre-coatings, said one or more coatings that comprise colloidal nanocrystals coating said one or more pre-coatings and one or more coatings that coat said one or more coatings that comprise colloidal nanocrystals, each coating has a physical adherence to the respective surface or coating that said coating coats, to yield a lap shear strength in the range of at least 100 psi, preferably each coating has a physical adherence to the respective surface or coating that said coating coats, to yield a lap shear strength in the range of from about 1000 psi to about 7000 psi, more preferably each coating has a physical adherence to the respective surface or coating that said coating coats, to yield a lap shear strength in the range of from about 3000 psi to about 7000 psi, most preferably each coating has a physical adherence to the respective surface or coating that said coating coats, to yield a lap shear strength in the range of from about 5500 psi to about 7000 psi.

Applicant discloses the article of Paragraphs 0022 through 0029, said article being a component of a marine vehicle, land vehicle, aerospace vehicle, garment, container, structure or plant.

Applicant discloses the article of Paragraph 0030 wherein:
a) said marine vehicle is ship, submarine, surf board, canoe, kayak, paddle board, raft and/or jet ski;
b) said land vehicle is a car, tank, truck, motorcycle, train, bus, trolley all-terrain vehicle, bicycle, or skateboard;
c) said aerospace vehicle is weather balloon, manned aircraft, unmanned aircraft, quadcopter, airborne missile, scientific balloon, sounding rocket space shuttle launch vehicle, ballistic missile, satellite, space station, or interplanetary vehicle;

d) said garment is body armor, helmet, or clothing, preferably said clothing is selected from the group consisting of hat, socks, shirt, pants, shorts, coat, underwear, bra, shoe, boot, mask, sandal, or gloves;
e) said container is a backpack, bag, barrel, box, fanny pack, tank container or shipping container;
f) said structure is building, bridge, dam, pipe line, electric transmission tower, cell tower, wind mill, solar panel, sign, light post, road, or runway; and
g) said plant is a tree.

Suitable materials for making the nanocrystals impregnated porous article of Paragraphs 0022 through 0031 can be obtained from NNCrystal US Corporation of Fayetteville, AR, Kayakli Advanced Materials, Inc. of Westborough, MA and Solvay S. A., Neder-Over-Heembeek, Brussels, Belgium.

Aerospace vehicles include those provided in Table 1 below.

TABLE 1

Aerospace Vehicle Type and Modes of Guidance, Navigation, and Control

| Vehicle | GNC Methods | Maneuver Method |
|---|---|---|
| AIR | | |
| Weather Balloon | radiosonde, theodolite | pressure inside balloon |
| Manned aircraft | altimeter, inertial navigation system (INS), Global Positioning System (GPS) | thrust, flight control surfaces |
| Unmanned aircraft | altimeter, INS, GPS | thrust, flight control surfaces |
| Quadcopter | visual sensor, GPS | propeller(s) |
| Airborne Missile | altimeter, INS, GPS | thrust, flight control surfaces |
| AEROSPACE | | |
| Scientific Balloon | star camera, altimeter | pressure inside balloon |
| Sounding Rocket | ring laser gyro, altimeter, accelerometers | thrust, flight control surfaces |
| Space Shuttle | human-in-the-loop, star camera | thrust, flight control surfaces |
| Launch Vehicle (Rocket) | INS, ring laser gyro, altimeter, accelerometers | thrust, flight control surfaces |
| Ballistic Missile | INS, GPS | thrust, flight control surfaces |
| SPACE | | |
| Satellite | star camera, sun sensor, horizon sensor, GPS | thruster, electric propulsion, magnetorquer, momentum wheel |
| Space Station | human, star camera, sun sensor, horizon sensor, GPS | thruster, electric propulsion, magnetorquer, momentum wheel |
| Interplanetary Vehicle | star camera, sun sensor | thruster, electric propulsion, momentum wheel |

Examples of Flight Control Surfaces: Fins, Ailerons, Elevators.
Thrust includes the two-directional thrust force, as well as any gimbaled thrust vectoring the vehicle is capable of generating.

Process of Making Article Comprising Bonded Substrate Comprising Nanocrystals

Applicant discloses a process of making said invention by mixing nanocrystals within a substrate, preferably said in a homogeneous form. An article under test is coated with a bonding substrate and cured. Then, the nanocrystal impregnated substrate is applied to a surface by either coating or spray coating. The nanocrystal impregnated substrate is then cured.

Applicant discloses a process of making an article according to Paragraphs 0022 through 0031, comprising curing one or more coatings that comprise colloidal nanocrystals, said one or more coatings that comprise colloidal nanocrystals coating one or more pre-coatings that coat the surface of said article and optionally applying one or more coatings that coat said one or more coatings that comprise colloidal nanocrystals and curing said one or more coatings that coat said one or more coatings that comprise colloidal nanocrystals.

Applicant discloses the process of Paragraph 0035 wherein said curing comprises heating and/or exposing said coating and/or pre-coating to UV light.

Method of Using Article Comprising Bonded Substrate Comprising Nanocrystals

Applicant discloses a method of using said invention by using an excitation light source with a lower wavelength of emission than the emission of the said nanocrystals. Any optical method can then be used to focus the emitted light into a spectrometer. The relative change in intensity along certain spectral wavelengths can then be used and calibrated, preferably said to create a stress-strain curve for analysis of an article under test.

From Paragraph 0048, the Applicant discloses a method of calculating the relative change in photoluminescence intensity by taking the emission photoluminescence peak of the nanocrystal and subtracting it to a side of the peak. This value is taken at the beginning of strain and compared against this value over the period of applied strain to the sample under test.

Applicant discloses a method of plotting relative change in photoluminescence intensity collected using the method from Paragraph 0049 in accordance to strain. The strain of the sample under test is laid out on the X axis and the relative change in photoluminescence intensity is laid out on the Y axis. This method is not all inclusive in relating strain to the relative emission intensity of the nanocrystals.

Applicant discloses a method of using an article according to Paragraphs 0022 through 0031, comprising:
a) exposing the colloidal nanocrystals of said article according to Paragraphs 0022 through 0031 to a wavelength of light that is lower than the emission wavelength of said colloidal nanocrystals;
b) collecting the wavelength emission from said colloidal nanocrystals that results from said colloidal nanocrystals being exposed to said wavelength of light that is lower than the emission wavelength of said colloidal nanocrystals, said wavelength emission comprising a emission wavelength plateau;
c) selecting one or more reference points on at least one side of the emission wavelength plateau of the nanocrystals and selecting one or more points at the emission wavelength plateau of the nanocrystals in real-time;
d) averaging, when more than one reference point is taken on at least one side of the emission wavelength plateau of the nanocrystals, said reference points taken on at least one side of the emission wavelength plateau of the nanocrystals;
e) averaging, when more than one reference point is taken at the emission wavelength plateau of the nanocrystals in real-time, said one or more points taken at the emission wavelength plateau of the nanocrystals in real-time;
f) calculating the difference between the average of the one or more reference points on at least one side of the emission wavelength plateau of the nanocrystals and the average of the one or more points taken at the emission wavelength plateau of the nanocrystals in real-time to yield the relative emission intensity as the sample is strained; with the proviso that when only a single reference point is taken on at least one side of the emission wavelength plateau of the nanocrystals and/or emission wavelength plateau of the nanocrystals in real-time, each of said single reference points, for purposes of this method, is treated as an average value;

g) comparing the relative emission intensity to a pre-existing stress strain data set to yield a strain value for said article.

Applicant discloses the method of Paragraph 0040 wherein more than one reference points on at least one side of the peak emission wavelength of the nanocrystals are taken and more than one reference points at the peak emission wavelength plateau of the nanocrystals in real-time are taken.

Applicant discloses the method of Paragraphs 0040 through 0041 wherein more than one reference points on each side of the peak emission wavelength plateau of the nanocrystals are taken.

Applicant discloses the method of Paragraphs 0040 through 0042 wherein said one or more reference points on at least one side of the peak emission wavelength plateau of the nanocrystals are taken at the base of the peak emission wavelength plateau of the nanocrystals.

Applicant discloses a method of using an article according to Paragraphs 0022 through 0031, comprising:

a) exposing the colloidal nanocrystals of said article according to Paragraphs 0022 through 0031 to a wavelength of light that is lower than the emission wavelength of said colloidal nanocrystals;

b) collecting the wavelength emission from said colloidal nanocrystals that results from said colloidal nanocrystals being exposed to said wavelength of light that is lower than the emission wavelength of said colloidal nanocrystals, said wavelength emission comprising a peak emission wavelength;

c) selecting one or more reference points on at least one side of the peak emission wavelength of the nanocrystals and selecting one or more points at the peak emission wavelength of the nanocrystals in real-time;

d) averaging, when more than one reference point is taken on at least one side of the peak emission wavelength of the nanocrystals, said reference points taken on at least one side of the peak emission wavelength of the nanocrystals;

e) averaging, when more than one reference point is taken at the peak emission wavelength of the nanocrystals in real-time, said one or more points taken at the peak emission wavelength of the nanocrystals in real-time;

f) calculating the difference between the average of the one or more reference points on at least one side of the peak emission wavelength of the nanocrystals and the average of the one or more points taken at the peak emission wavelength of the nanocrystals in real-time to yield the relative emission intensity as the sample is strained; with the proviso that when only a single reference point is taken on at least one side of the peak emission wavelength of the nanocrystals and/or peak emission wavelength of the nanocrystals in real-time, said single reference point for purposes of this method treated as an average value; g) comparing the relative emission intensity to a pre-existing stress strain data set to yield a strain value for said article.

Applicant discloses the method of Paragraph 0044 wherein more than one reference points on at least one side of the peak emission wavelength of the nanocrystals are taken and more than one reference points at the peak emission wavelength of the nanocrystals in real-time are taken.

Applicant discloses the method of Paragraphs 0044 through 0045 wherein more than one reference points on each side of the peak emission wavelength of the nanocrystals are taken.

Applicant discloses the method of Paragraphs 0044 through 0045 wherein said one or more reference points on at least one side of the peak emission wavelength of the nanocrystals are taken at the base of the peak emission wavelength of the nanocrystals and said one or more points at the peak emission wavelength of the nanocrystals are taken about said peak emission wavelength of the nanocrystals in real-time.

Test Methods

Method for measuring the spectral emission of the nanocrystal impregnated substrate on a test sample. For the purpose of this specification, the following method shall be used:

1) Obtain a 301 stainless steel dog-bone foil with the following neck dimensions: 83.312 mm±0.1 mm×12.7 mm±0.1 mm×0.1016 mm±0.1 mm
2) Pre-coat the 301 stainless steel dog-bone foil with Solvay BR-6747-1 with a surface roughness measured with a profilometer on average of 0.483 μm±0.1
3) Prepare a commercial-off-the-shelf InP/ZnS colloidal quantum dot loaded polymer mixture from NN-Labs (wavelength of emission when ordered 530 nm) and thinly coat with a flat tip tweezer across a 20 mm±5 mm×12.7 mm±0.1 mm surface on the surface of the pre-coated dog-bone foil
4) Place sample in a convection oven at 121.11° C.±5° C. for 23 minutes and 30 seconds±10 s
5) Acquire a hydraulic test frame (model number: MTS Systems Corporation 370.02) and a transducer (model number: MTS Systems Corporation 661.19H-04)
6) Place cured sample into the hydraulic test frame clamped between the actuator and the transducer
7) Fiber couple an Ocean Optics FLAME-S-VIS-NIR spectrometer to a Thorlabs zoom fiber collimator ZC618APC-A which said collimator is directly facing the quantum dot coated surface of the dog-bone foil in the test frame
8) Aim a standard blacklight onto the quantum dot coated surface
9) Start collecting spectral data from the spectrometer by applying tensile strain to the sample at a displacement of $8.7750 \times 10^{-4}$ in/s±$0.001 \times 10^{-4}$ in/s
10) Continue collecting spectral data until failure of sample.

Test methods for determining lap shear strength. For the purpose of this specification, the following method shall be used:

Lap shear strength is measured by using measurement standard ASTM D 1002 (2019) at a temperature of 24 degrees Celsius using a 2024-T3 bare aluminum substrate with its surface treated with both FPL etch (sulfuric acid-dichromate) and PAA (phosphoric acid anodizing). All coatings in this invention can have their lap shear strength use this method to characterize lap shear strength on other material classes (the substrate used in ASTM D 1002 (2019)) such as: wood, metal, ceramic, plastic, and polymer.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The preferred configuration of this invention is to have a rastering laser excite small volumes of nanocrystals over the surface of a device under test and collect the spectral information over the surface. This can be paired with navigation instrumentation to allow the 3D surface mapping of a device under test and can be described by FIG. 1.

Figure 2:
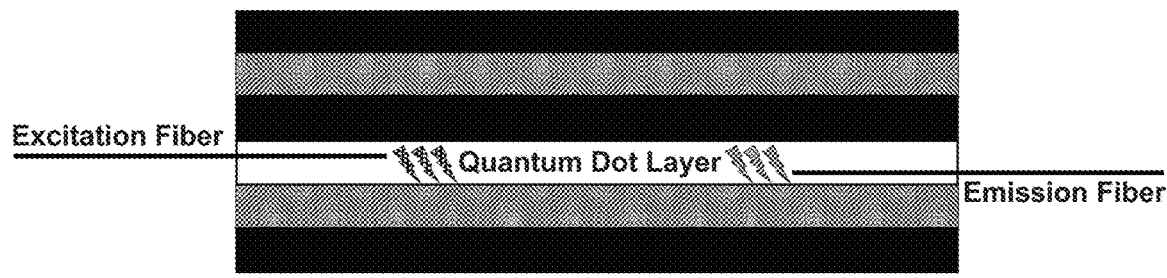
FIG. 2 is showing the idea of using both an excitation fiber and a light collecting fiber to measure the strain of the nanocrystals within a structure or composite.

Instead of coating a surface with nanocrystals, they could instead be embedded within a composite or structure. Excitation can occur through the use of an excitation fiber and the spectral emission of the nanocrystals can be collected with another fiber to send back to a spectrometer. This is further described in FIG. 2.

Figure 3:
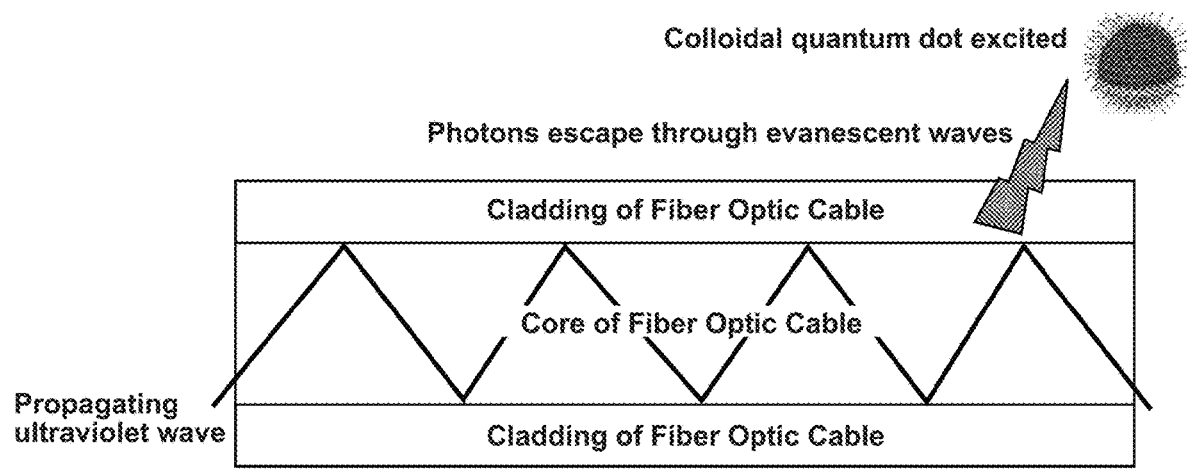
FIG. 3 is showing how an optical fiber can excite nearby nanocrystals by using the evanescent light from the fiber's surface.

Excitation from a fiber as described in Paragraph 0052 can be described by FIG. 3.

Figure 4:
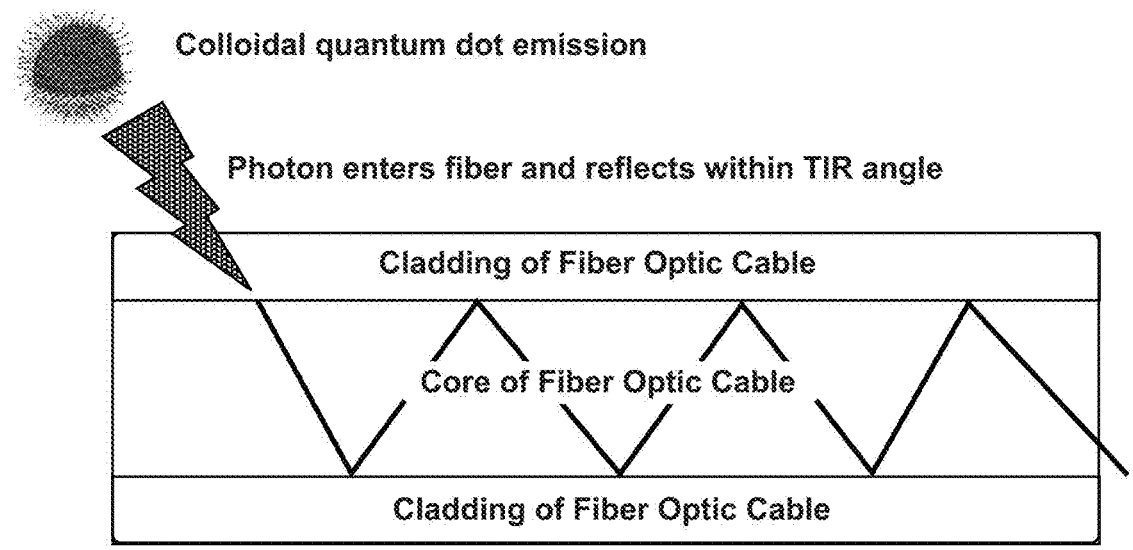
FIG. 4 is showing how the optical emission from the nanocrystal layer within a structure or composite can be collected by a nearby fiber. When the emitted photon is within the total internal reflectance angle of the fiber, it could be collected and sent back to a spectrometer.
Figure 6:
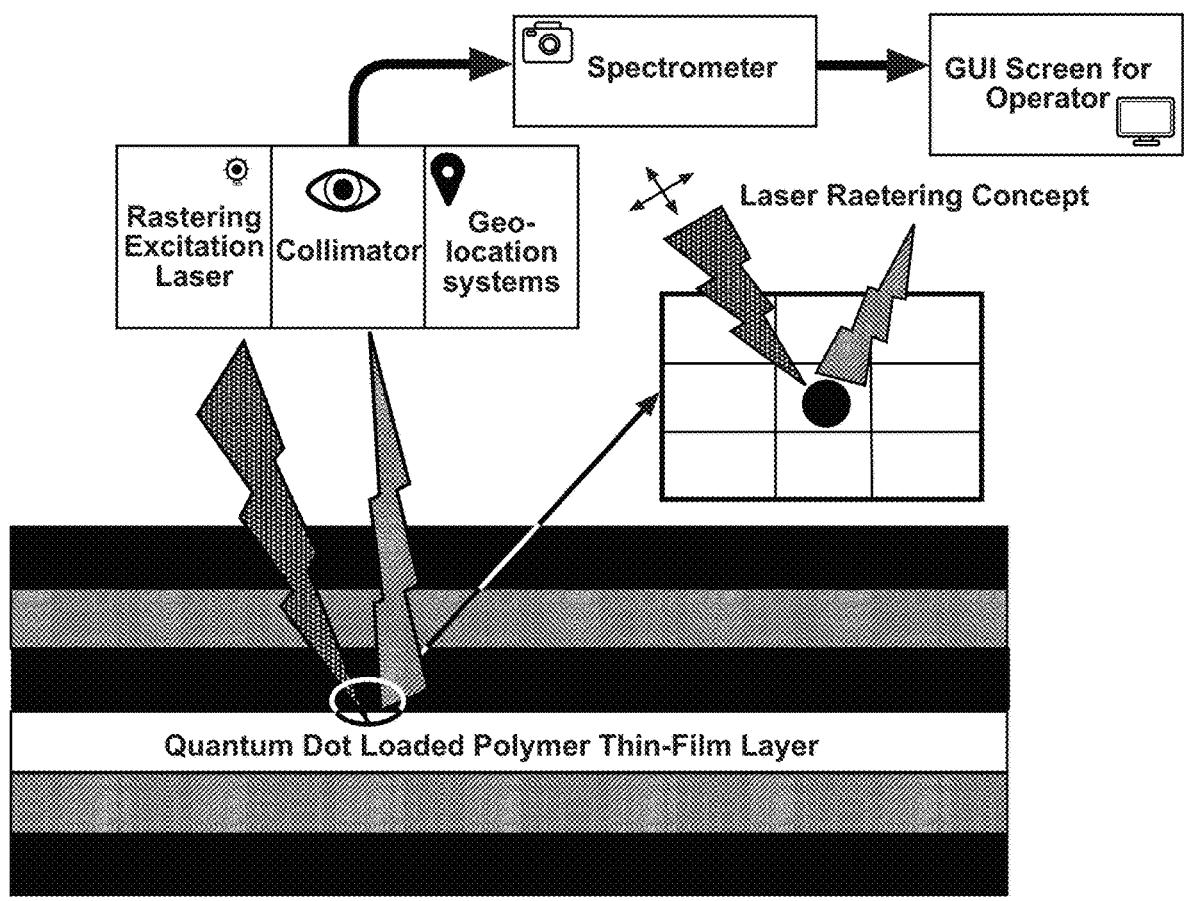
FIG. 6 is showing the preferred method in measuring the strain of a surface under test by exciting and measuring the optical emission of the nanocrystals embedded within a composite. It is showing that the composite structure appears transparent to both the optical excitation frequency and the optical emission frequency.

The collection of nanocrystal emission as described in Paragraph 0052 can be described by FIG. 4 when the photon meets the total internal reflection angle required to waveguide in the fiber:

A layer of nanocrystals is embedded within a composite structure with the nanocrystals specifically designed to emit at an optical frequency that is transparent to the composite structure and the excitation source optical frequency is also transparent to the composite structure. This is further described in FIG. 5:

From Paragraph 0055, the preferred optical measurement method is described by FIG. 6.

Figure 7:
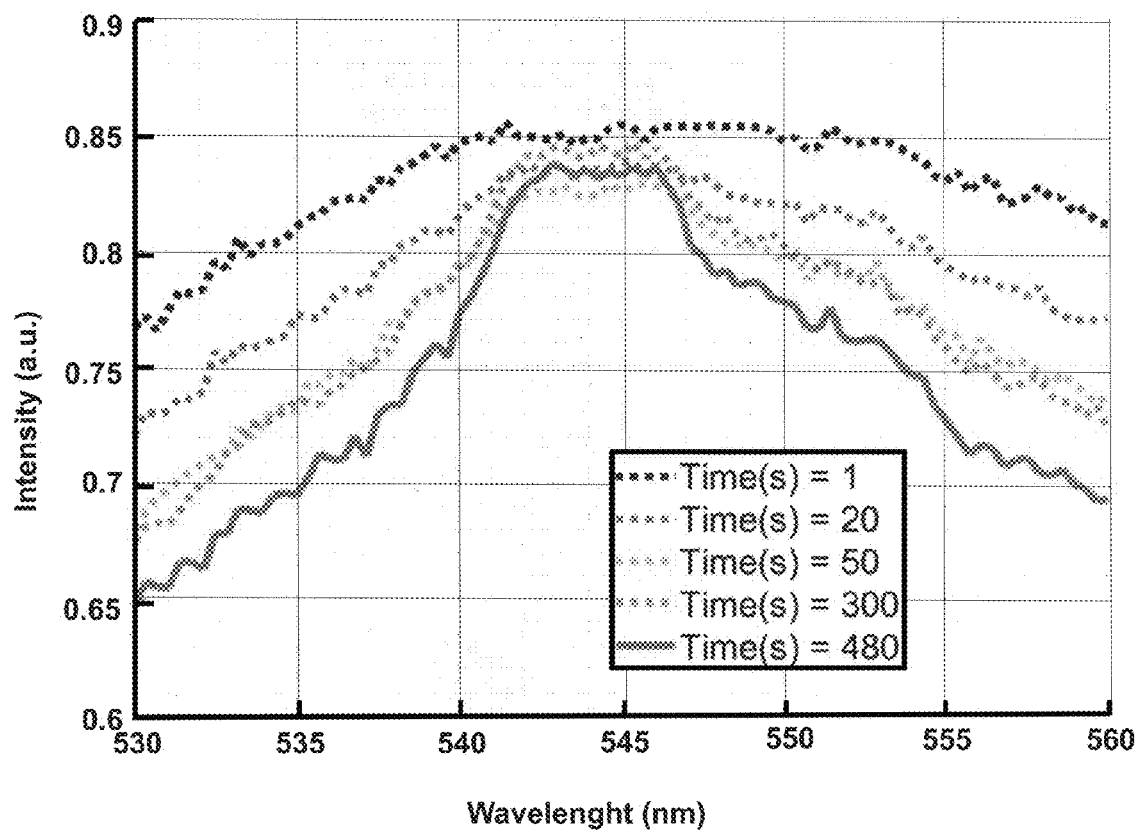
FIG. 7 is showing the change of optical spectra from the emission of the colloidal quantum dots over applied strain over time.

The optical data coming from the spectrometer from the method described in Paragraph 0052 can be seen over time with increasing strain at the peak photoluminescence emission of the InP/ZnS colloidal quantum dots in FIG. 7.

Figure 8:
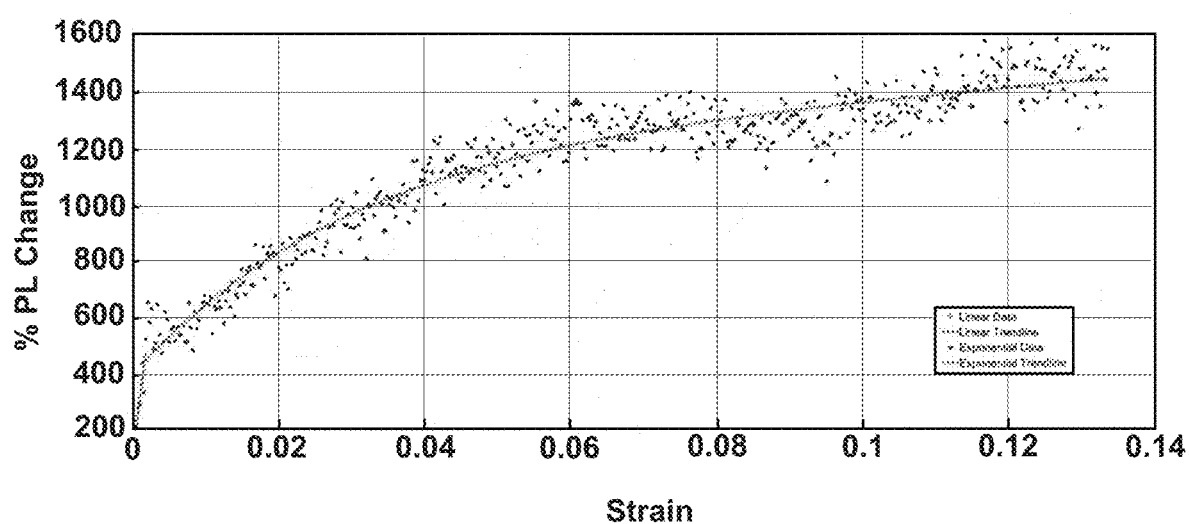
FIG. 8 is showing the relative emission intensity of the colloidal quantum dots as a percentage plotted against the strain of the sample under test.

The optical measurements results obtained as described in Paragraph 0052 when compared to the strain of a dog-bone foil sample can be seen in FIG. 8:

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of using an article, said article comprising a surface, said surface comprising one or more pre-coatings; one or more coatings that comprise colloidal nanocrystals, said one or more pre-coatings coating said surface and said one or more coatings that comprise colloidal nanocrystals coating said one or more pre-coatings, said method comprising:
    a) exposing the colloidal nanocrystals of said article to a wavelength of light that is lower than the emission wavelength of said colloidal nanocrystals;
    b) collecting the wavelength emission from said colloidal nanocrystals that results from said colloidal nanocrystals being exposed to said wavelength of light that is lower than the emission wavelength of said colloidal nanocrystals, said wavelength emission comprising an emission wavelength plateau;
    c) selecting one or more reference points on at least one side of the emission wavelength plateau of the nanocrystals and selecting one or more points at the emission wavelength plateau of the nanocrystals in real-time;
    d) averaging, when more than one reference point is taken on at least one side of the emission wavelength plateau of the nanocrystals, said reference points taken on at least one side of the emission wavelength plateau of the nanocrystals;
    e) averaging, when more than one reference point is taken at the emission wavelength plateau of the nanocrystals in real-time, said one or more points taken at the emission wavelength plateau of the nanocrystals in real-time;
    f) calculating the difference between the average of the one or more reference points on at least one side of the emission wavelength plateau of the nanocrystals and the average of the one or more points taken at the emission wavelength plateau of the nanocrystals in real-time to yield the relative emission intensity as the sample is strained; with the proviso that when only a single reference point is taken on at least one side of the emission wavelength plateau of the nanocrystals and/or emission wavelength plateau of the nanocrystals in real-time, each of said single reference points, for purposes of this method, is treated as an average value;
    g) comparing the relative emission intensity to a preexisting stress strain data set to yield a strain value for said article.

2. The method of claim 1 wherein more than one reference points on at least one side of the peak emission wavelength of the nanocrystals are taken and more than one reference points at the peak emission wavelength plateau of the nanocrystals in real-time are taken.

3. The method of claim 1 wherein more than one reference points on each side of the peak emission wavelength plateau of the nanocrystals are taken.

4. The method of claim 1 wherein said one or more reference points on at least one side of the peak emission wavelength plateau of the nanocrystals are taken at the base of the peak emission wavelength plateau of the nanocrystals.

5. A method of using an article, said article comprising a surface, said surface comprising one or more pre-coatings; one or more coatings that comprise colloidal nanocrystals, said one or more pre-coatings coating said surface and said one or more coatings that comprise colloidal nanocrystals coating said one or more pre-coatings, said method comprising:
    a) exposing the colloidal nanocrystals of said article to a wavelength of light that is lower than the emission wavelength of said colloidal nanocrystals;
    b) collecting the wavelength emission from said colloidal nanocrystals that results from said colloidal nanocrystals being exposed to said wavelength of light that is lower than the emission wavelength of said colloidal nanocrystals, said wavelength emission comprising a peak emission wavelength;

c) selecting one or more reference points on at least one side of the peak emission wavelength of the nanocrystals and selecting one or more points at the peak emission wavelength of the nanocrystals in real-time;

d) averaging, when more than one reference point is taken on at least one side of the peak emission wavelength of the nanocrystals, said reference points taken on at least one side of the peak emission wavelength of the nanocrystals;

e) averaging, when more than one reference point is taken at the peak emission wavelength of the nanocrystals in real-time, said one or more points taken at the peak emission wavelength of the nanocrystals in real-time;

f) calculating the difference between the average of the one or more reference points on at least one side of the peak emission wavelength of the nanocrystals and the average of the one or more points taken at the peak emission wavelength of the nanocrystals in real-time to yield the relative emission intensity as the sample is strained; with the proviso that when only a single reference point is taken on at least one side of the peak emission wavelength of the nanocrystals and/or peak emission wavelength of the nanocrystals in real-time, said single reference point for purposes of this method treated as an average value;

g) comparing the relative emission intensity to a preexisting stress strain data set to yield a strain value for said article.

6. The method of claim 5 wherein more than one reference points on at least one side of the peak emission wavelength of the nanocrystals are taken and more than one reference points at the peak emission wavelength of the nanocrystals in real-time are taken.

7. The method of claim 5 wherein more than one reference points on each side of the peak emission wavelength of the nanocrystals are taken.

8. The method of claim 5 wherein said one or more reference points on at least one side of the peak emission wavelength of the nanocrystals are taken at the base of the peak emission wavelength of the nanocrystals and said one or more points at the peak emission wavelength of the nanocrystals are taken about said peak emission wavelength of the nanocrystals in real-time.

* * * * *

UNITED STATES PATENT AND TRADEMARK OFFICE
CERTIFICATE OF CORRECTION

| | |
|---|---|
| PATENT NO. | : 12,031,074 B1 |
| APPLICATION NO. | : 17/001719 |
| DATED | : July 9, 2024 |
| INVENTOR(S) | : Michael D. Sherburne |

It is certified that error appears in the above-identified patent and that said Letters Patent is hereby corrected as shown below:

In the Drawings

Sheet 1; FIG. 1; and on the Title Page, the illustrative print figure; Delete "Raetering", Insert therefor --Rastering--.

Figure 5:
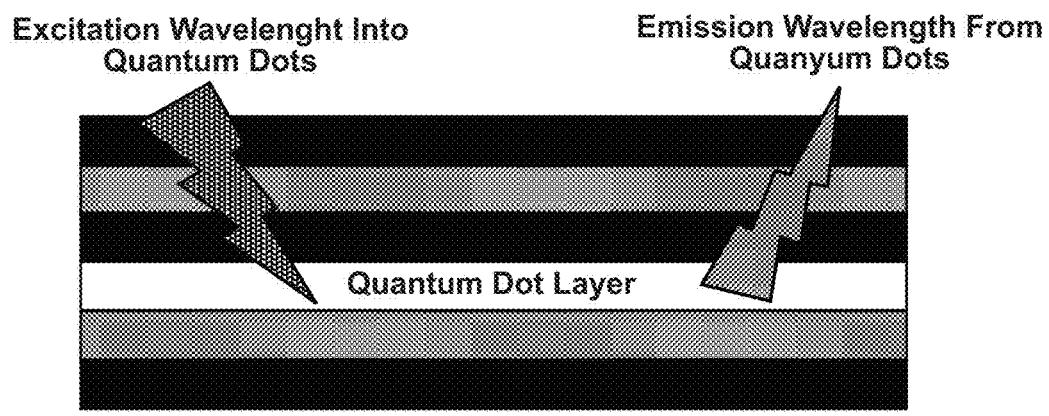
FIG. 5 is showing the example of embedding a nanocrystal layer within a composite with the emission frequency of the nanocrystal layer designed to be optically transparent to the composite and the excitation frequency optically transparent as well.

Sheet 3; FIG. 5; Delete "Quanyum", Insert therefor --Quantum--.

Sheet 4; FIG. 6; Delete "Raetering", Insert therefor --Rastering--.

Sheet 5; FIG. 7; Delete "Wavelenght", Insert therefor --Wavelength--.

Signed and Sealed this
Tenth Day of December, 2024

Katherine Kelly Vidal
*Director of the United States Patent and Trademark Office*